US010171948B2

(12) United States Patent
Chen et al.

(10) Patent No.: US 10,171,948 B2
(45) Date of Patent: Jan. 1, 2019

(54) METHOD FOR PERFORMING POSITIONING OPERATION AND ASSOCIATED ELECTRONIC DEVICE

(71) Applicant: MEDIATEK INC., Hsin-Chu (TW)

(72) Inventors: Po-Yu Chen, Hsinchu County (TW); Sheng-Po Kuo, Taipei (TW); Jen-Chieh Yang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/407,268

(22) Filed: Jan. 17, 2017

(65) Prior Publication Data

US 2018/0206076 A1 Jul. 19, 2018

(51) Int. Cl.
*H04W 4/029* (2018.01)

(52) U.S. Cl.
CPC .................................. *H04W 4/029* (2018.02)

(58) Field of Classification Search
CPC ... H04W 4/006; H04W 40/244; H04W 4/021; H04W 4/023; H04W 4/025; H04W 4/028; H04W 4/04; H04W 4/02
See application file for complete search history.

(56) References Cited

U.S. PATENT DOCUMENTS 7,188,026 B2 3/2007 Tzamaloukas
7,471,954 B2 12/2008 Brachet
8,244,272 B2 8/2012 Morgan
8,787,939 B2 7/2014 Papakipos
2008/0176583 A1 7/2008 Brachet
2012/0054440 A1 3/2012 Doig
2013/0237254 A1* 9/2013 Papakipos .............. G06Q 10/10 455/456.3
2014/0037109 A1* 2/2014 Ban .......................... H03G 3/20 381/107
2014/0343896 A1* 11/2014 Le Grand ........... G06F 11/3065 702/187
2016/0061957 A1* 3/2016 Li ........................... H04W 4/02 342/357.42
2017/0026909 A1* 1/2017 Gao ................. H04W 52/0229

* cited by examiner

*Primary Examiner* — Daniel Lai
(74) *Attorney, Agent, or Firm* — Winston Hsu

(57) ABSTRACT

An electronic device includes an application processor and a sensor hub, where the application processor is arranged for executing applications running on a system of the electronic device, and the sensor hub is arranged for obtaining and processing sensed data from a plurality of sensors within the electronic device. In addition, the application processor further downloads location data from a remote device via a network module, and at least a portion of the downloaded location data is further stored in a storage unit of the sensor hub to be reused for positioning.

9 Claims, 11 Drawing Sheets

Measurement data store ~102
Internet
100
Network module ~130
Application processor ~110
120
122
Sensor hub
Sensors

| ID | Lon | Lat |
|---|---|---|
| 001a1e05ee24 | 121.023086 | 24.772829 |
| 186472b3d0a0 | 121.023101 | 24.772841 |
| 001a1eb59964 | 121.023107 | 24.772839 |
| .... | | |
| .... | | |

| ID | Lon | Lat |
|---|---|---|
| 001a1e05ee24 | 121.023086 | 24.772829 |
| 186472b3d0a0 | 121.023101 | 24.772841 |
| 001a1eb59964 | 121.023107 | 24.772839 |

| ID |
|---|
| 001a1e05ee24 |
| 186472b3d0a0 |
| 001a1eb59964 |

METHOD FOR PERFORMING POSITIONING OPERATION AND ASSOCIATED ELECTRONIC DEVICE

BACKGROUND

Generally, a user can get user location by using a Global Positioning System (GPS) and/or Wi-Fi positioning system which is built within a portable device. However, the GPS only works outside due to the reception of the satellite signals, causing inconvenience to the user; and the Wi-Fi/Cell positioning system needs to always enable an application processor and network module to get Wi-Fi/Cell identities (IDs) and their location data via Internet, causing large power consumption when the position operation is performed.

SUMMARY

It is therefore an objective of the present invention to provide an electronic device, which can store the location data of the Wi-Fi/Cell IDs in a storage unit of a sensor hub, and the stored location data can be reused in the next positioning operation, to solve the above-mentioned problems.

According to one embodiment of the present invention, an electronic device comprises an application processor and a sensor hub. The application processor is arranged for executing applications running on a system of the electronic device. The sensor hub is coupled to the application processor, and is arranged for obtaining and processing sensed data from a plurality of sensors within the electronic device. In addition, the application processor further downloads location data from a remote device via a network module, and at least a portion of the downloaded location data is further stored in a storage unit of the sensor hub to be reused for positioning.

According to another embodiment of the present invention, a method for performing positioning operation of an electronic device comprises: downloading location data from a remote device via a network module; and storing at least a portion of the downloaded location data in a storage unit of a sensor hub to be reused for positioning.

According to another embodiment of the present invention, a method for performing replacement operation of a storage unit of a sensor hub or an application processor comprises: identifying most unlikely to-be-used location data stored in the storage unit; and discarding the identified location data in the storage unit of the sensor hub or the application processor.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
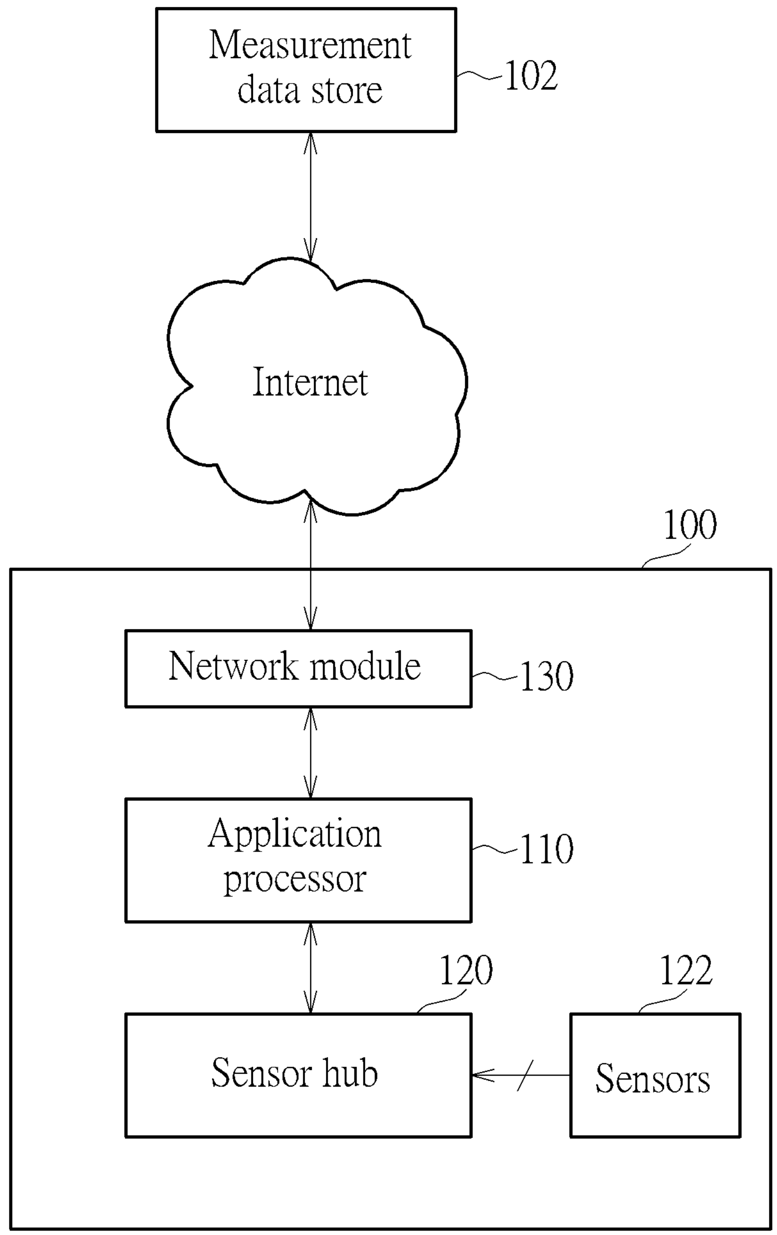
FIG. 1 is a diagram illustrating an electronic device according to one embodiment of the present invention.

Please refer to FIG. 1, which is a diagram illustrating an electronic device 100 according to one embodiment of the present invention. In this embodiment, the electronic device 100 is a portable device such as a smartphone or a tablet, and the electronic device 100 comprises an application processor 110, a sensor hub 120, a plurality of sensors 122 and a network module 130. The application processor 110 is arranged to execute applications running on a system of the electronic device. The sensor hub 120 is arranged to directly obtain and process sensed data from the sensors 122, and to communicate information about the sensed data with the application processor 110, where the sensor hub 120 and the application processor 110 are different chips. The sensors 122 may comprise an accelerometer, a noise sensor, a proximity sensor, an ambient light sensor, a temperature sensor, a pedometer or a GPS etc. The network module 130 may comprise at least a Cell module or a Wi-Fi module or any suitable network circuit capable of connecting to Internet.

In the embodiment shown in FIG. 1, besides the conventional functions, the sensor hub 120 is further used to store cell IDs (e.g., the Wi-Fi access point IDs and/or cellular base station IDs and/or BLUETOOTH device ID and/or identification sequence for other types of wireless transmission protocols) and their location data such as latitude and longitude, wherein the location data may be downloaded from a measurement data store 102 via Internet. The location data stored in a storage unit the sensor hub 120 can be reused for following network positioning operations to save the power consumption of the application processor 110 and the network module 130. The detailed operations are described in the following embodiments.

In addition, because the present invention focuses on the processes of the location data and the reuse of the location data, the conventional operations of the application processor 110, the sensor hub 120, the network module 130 and the Wi-Fi positioning system are therefore omitted here.

Figure 2:
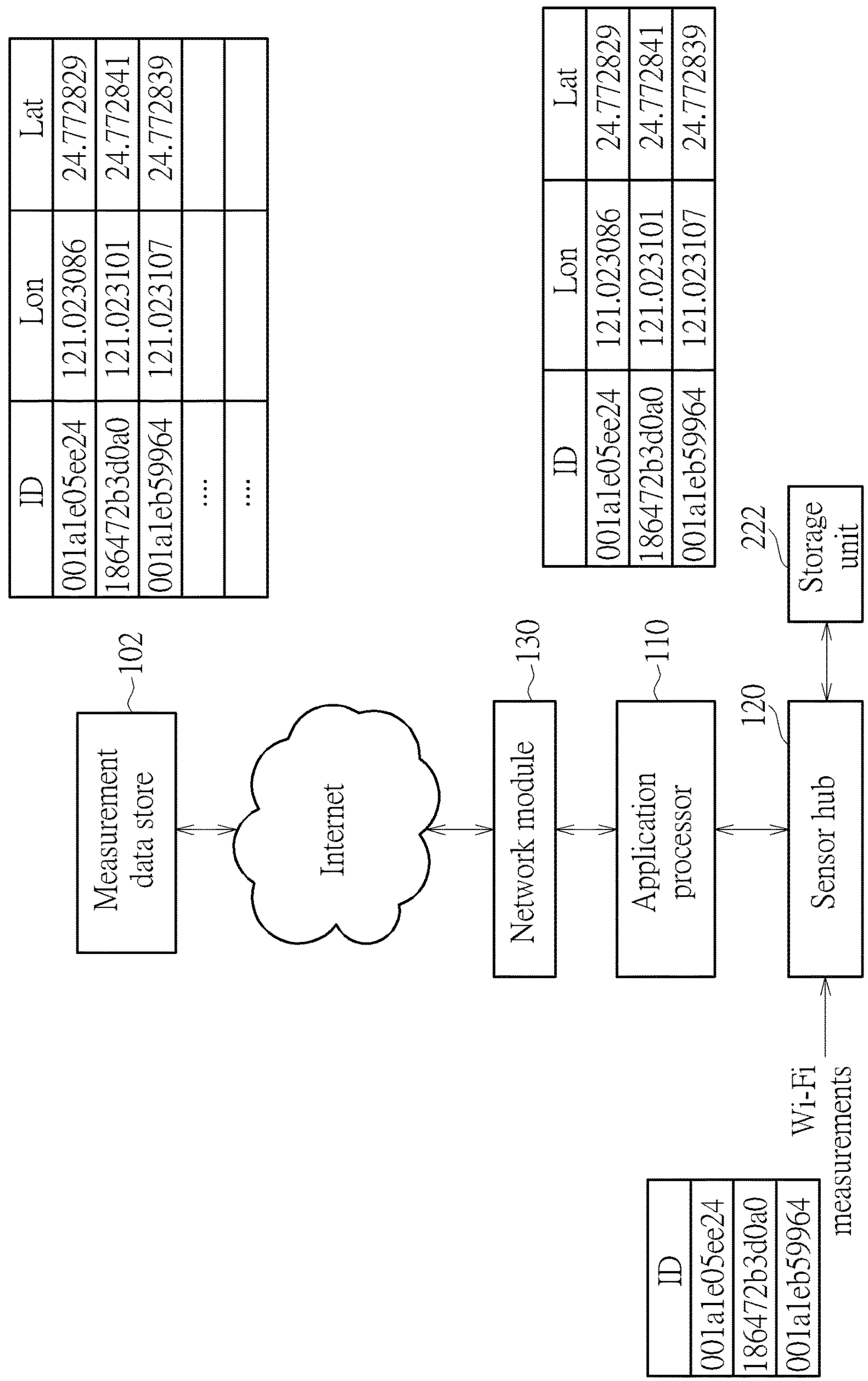
FIG. 2 is a block diagram illustrating the Wi-Fi positioning operations according to a first embodiment of the present invention.
Figure 3:
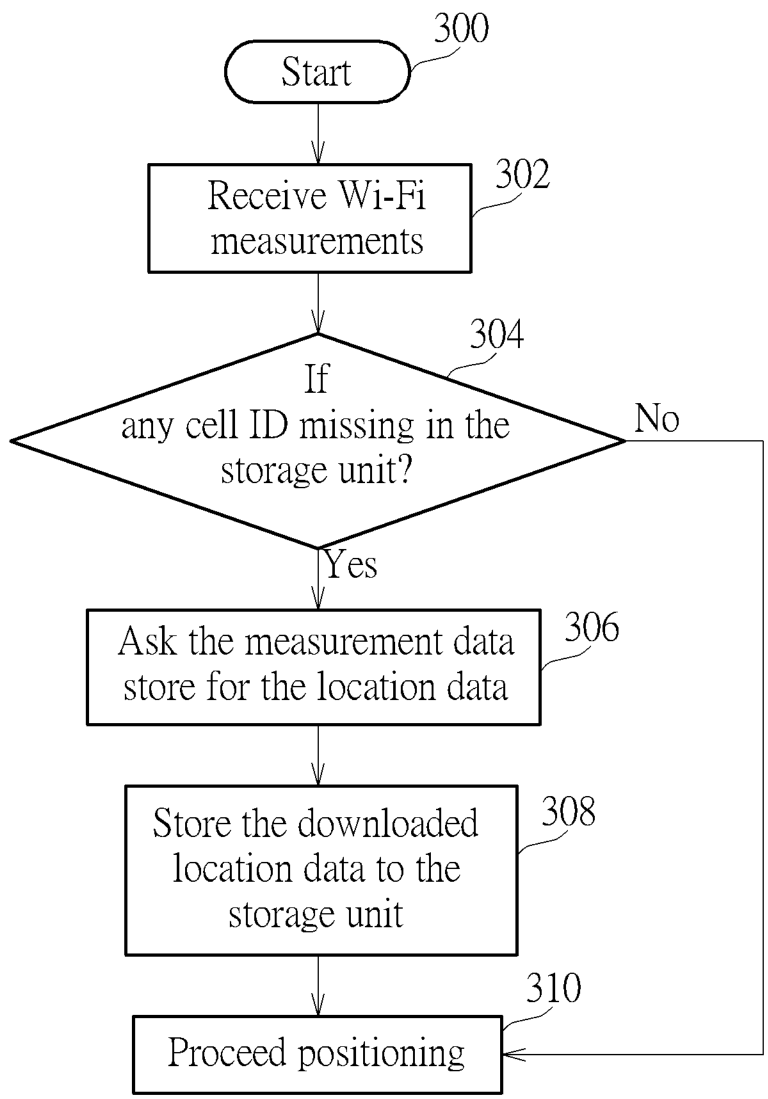
FIG. 3 is a flowchart of a method for performing the Wi-Fi positioning operations according to the first embodiment of the present invention.

Please refer to FIG. 2 and FIG. 3 together, where FIG. 2 is a block diagram illustrating the Wi-Fi positioning operations according to a first embodiment of the present invention, and FIG. 3 is a flowchart of a method for performing the Wi-Fi positioning operations according to the first embodiment of the present invention. In this embodiment, the electronic device 100 further comprises a storage unit 222, where the storage unit 222 is directly accessed by the sensor hub 120 without using the application processor 110, and the storage unit 222 can be implemented by static random access memory (SRAM), dynamic random access memory (DRAM) or any other suitable memory device, and the storage unit 222 may be positioned within the sensor hub 120 or outside the sensor hub 120. Referring to FIG. 3, in Step 300, the flow starts and user starts the positioning functions of the electronic device 100. In Step 302, the sensor hub 120 directly receives the Wi-Fi measurements from Wi-Fi detecting circuit, wherein the Wi-Fi measurements may comprise Wi-Fi cell IDs capable of being detected by the electronic device 100 (i.e. the access points corresponding to these Wi-Fi cell IDs are close to the electronic device 100). In this embodiment, the Wi-Fi measurements comprise three Wi-Fi cell IDs as shown in FIG. 2. In Step 304, the sensor hub 120 directly asks the storage unit 222 for the location data of the three Wi-Fi cell IDs, and the storage unit 222 sends the location data of the Wi-Fi cell IDs, if any, to the sensor hub 120. In this embodiment, if the sensor hub 120 can get all of the location data of the Wi-Fi cell IDs (that is no Wi-Fi cell ID is missed), the flow enters Step 310 to proceed the Wi-Fi positioning operation; and if the sensor hub 120 cannot get all of the location data of the Wi-Fi cell IDs (that is one or more Wi-Fi cell IDs is/are missed), the flow enters Step 306. In Step 306, the application processor 110 asks the measurement data store 102 for the location data that is not obtained from the storage unit 222, and the application processor 110 downloads the location data from the measurement data store 102 via Internet. In Step 308, the sensor hub 120 receives the downloaded location data from the application processor 110 and stores the downloaded location data into the storage unit 222. In Step 310, the sensor hub 120 uses at least a portion of the location data of the three Wi-Fi cell IDs to calculate a location of the electronic device 110.

In the embodiments shown in FIG. 2 and FIG. 3, if the sensor hub 120 can get all of the location data of the Wi-Fi cell IDs from the storage unit 222, the Wi-Fi positioning operation can be performed by the sensor hub 120 only, and the application processor 120 and the network module 130 does not need to work for the positioning operation. In other words, the application processor 120 and the network module 130 work for the positioning operation only when the location data is missed in the storage unit 222 of the sensor hub 120. Therefore, by using the storage unit 122 storing the location data that may be reused further, the network activity and the usage of the application processor 120 can be reduced to improve the power consumption.

Figure 4:
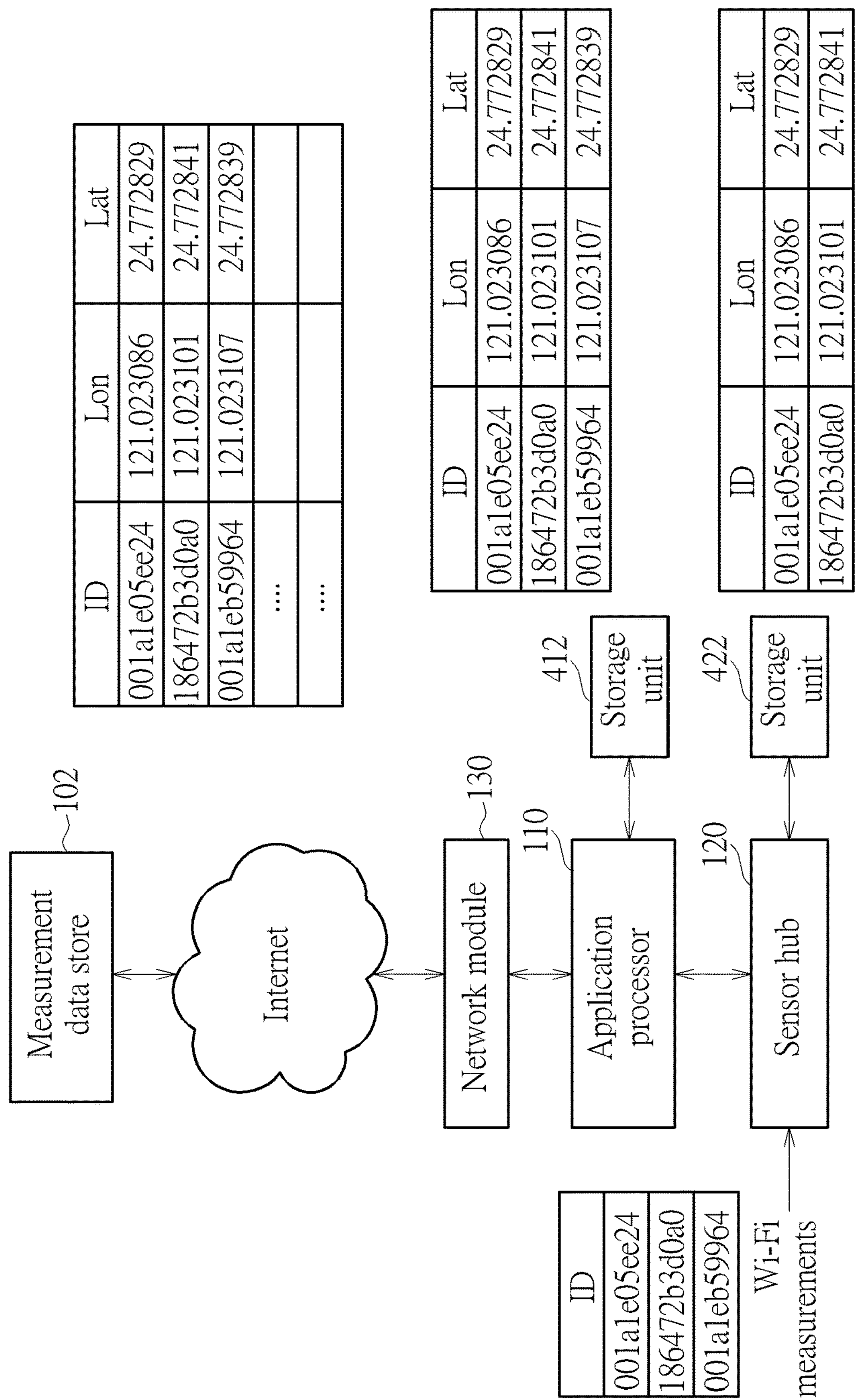
FIG. 4 is a block diagram illustrating the Wi-Fi positioning operations according to a second embodiment of the present invention.
Figure 5:
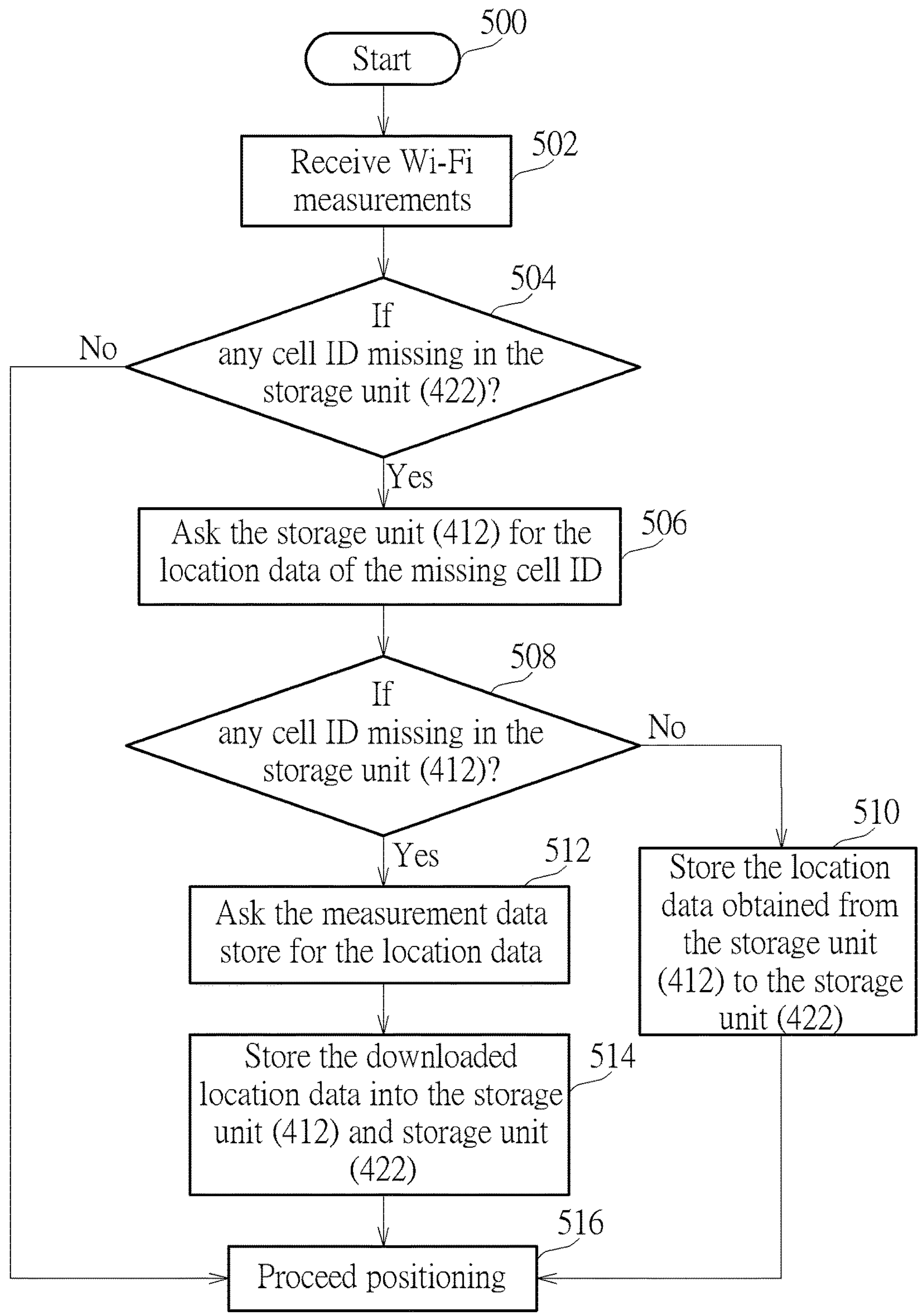
FIG. 5 is a flowchart of a method for performing the Wi-Fi positioning operations according to the second embodiment of the present invention.

Please refer to FIG. 4 and FIG. 5 together, where FIG. 4 is a block diagram illustrating the Wi-Fi positioning operations according to a second embodiment of the present invention, and FIG. 5 is a flowchart of a method for performing the Wi-Fi positioning operations according to the second embodiment of the present invention. In this embodiment, the electronic device 100 further comprises two storage units 412 and 422, where the storage unit 412 is directly accessed by the application processor 110, the storage unit 412 can be implemented by SRAM, DRAM or any other suitable memory device, and the storage unit 412 may be positioned within the application processor 110 or outside the application processor 110; and the storage unit 422 is directly accessed by the sensor hub 120, the storage unit 422 can be implemented by SRAM, DRAM or any other suitable memory device, and the storage unit 422 may be positioned within the sensor hub 120 or outside the sensor hub 120. In this embodiment, a memory size of the storage unit 412 is much larger than a memory size of the storage unit 422, for example, the storage unit 412 may be 1-100 mega-bytes while the storage unit 422 may be 1-100 kilobytes. Referring to FIG. 5, in Step 500, the flow starts and user starts the positioning functions of the electronic device 100. In Step 502, the sensor hub 120 directly receives the Wi-Fi measurements from a Wi-Fi detecting circuit, wherein the Wi-Fi measurements may comprise Wi-Fi cell IDs capable of being detected by the electronic device 100 (i.e. the access points corresponding to these Wi-Fi cell IDs are close to the electronic device 100). In this embodiment, the Wi-Fi measurements comprise three Wi-Fi cell IDs as shown in FIG. 4. In Step 504, the sensor hub 120 directly asks the storage unit 422 for the location data of the three Wi-Fi cell IDs, and the storage unit 422 sends the location data of the Wi-Fi cell IDs, if any, to the sensor hub 120. In this embodiment, if the sensor hub 120 can get all of the location data of the Wi-Fi cell IDs (that is no Wi-Fi cell ID is missed), the flow enters Step 516 to proceed the Wi-Fi positioning operation; and if the sensor hub 120 cannot get all of the location data of the Wi-Fi cell IDs (that is one or more Wi-Fi cell IDs is/are missed), the flow enters Step 506. In Step 506, the sensor hub 120 asks the application processor 110 for the location data that is not obtained from the storage unit 422, and the application processor 110 directly asks the storage unit 412 for the location data that is not obtained from the storage unit 422 (e.g. the location data of the Wi-Fi cell ID "001a1eb59964 shown in FIG. 4), and the storage unit 412 sends the location data of the Wi-Fi cell IDs, if any, to the application processor 110. In this embodiment, if the application processor 110 can get all of the location data requested by the sensor hub 120, the flow enters Step 510; and if the application processor 110 cannot get all of the location data requested by the sensor hub 120 (that is one or more Wi-Fi cell IDs is/are still missed), the flow enters Step 512. In Step 510, the application processor 110 forwards the location data obtained from the storage unit 412 to the sensor hub 120, and the sensor hub 120 stores the obtained location data (e.g. the location data of the Wi-Fi cell ID "001a1eb59964 shown in FIG. 4) into the storage unit 422. In Step 512, the application processor 110 asks the measurement data store 102 for the location data that is not obtained from the storage unit 412, and the application processor 110 downloads the location data from the measurement data store 102 via Internet. In Step 514, the application processor 110 stores the downloaded location data into the storage unit 412, and the sensor hub 120 receives the downloaded location data from the application processor 110 and stores the downloaded location data into the storage unit 422. In Step 516, the sensor hub 120 uses at least a portion of the location data of the three Wi-Fi cell IDs to calculate a location of the electronic device 110.

In the embodiments shown in FIG. 4 and FIG. 5, the storage unit 422 of the sensor hub 120 can be regarded as a level-1 cache, and the storage unit 412 of the application processor 110 can be regarded as a level-2 cache. Compared with the embodiment shown in FIG. 2 and FIG. 3, by further using the storage unit 412 of the application processor 110, a cache hit rate may increase to reduce the network activity, and a power consumption of the network module 130 can be improved more.

Figure 6:
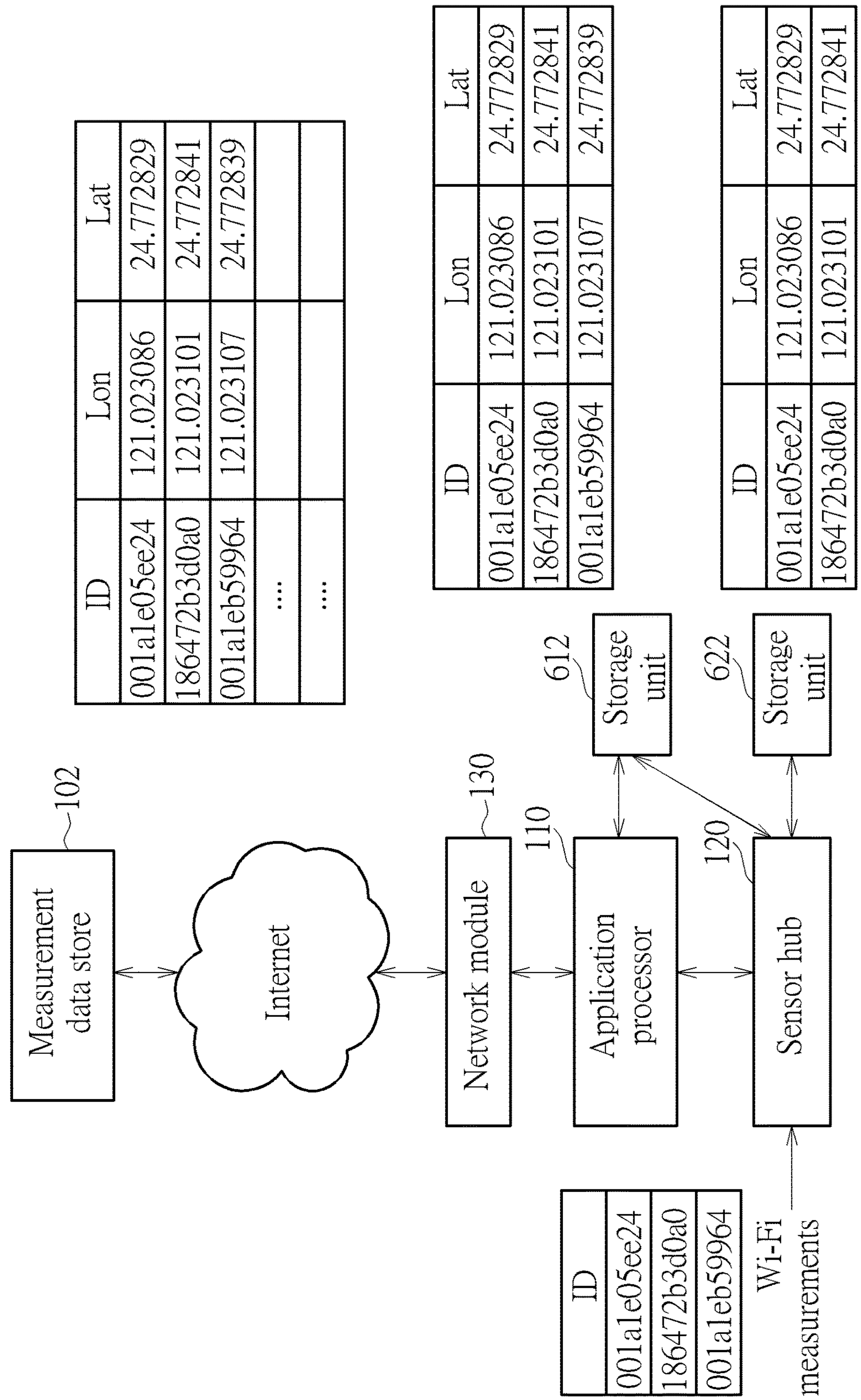
FIG. 6 is a block diagram illustrating the Wi-Fi positioning operations according to a third embodiment of the present invention.
Figure 7:
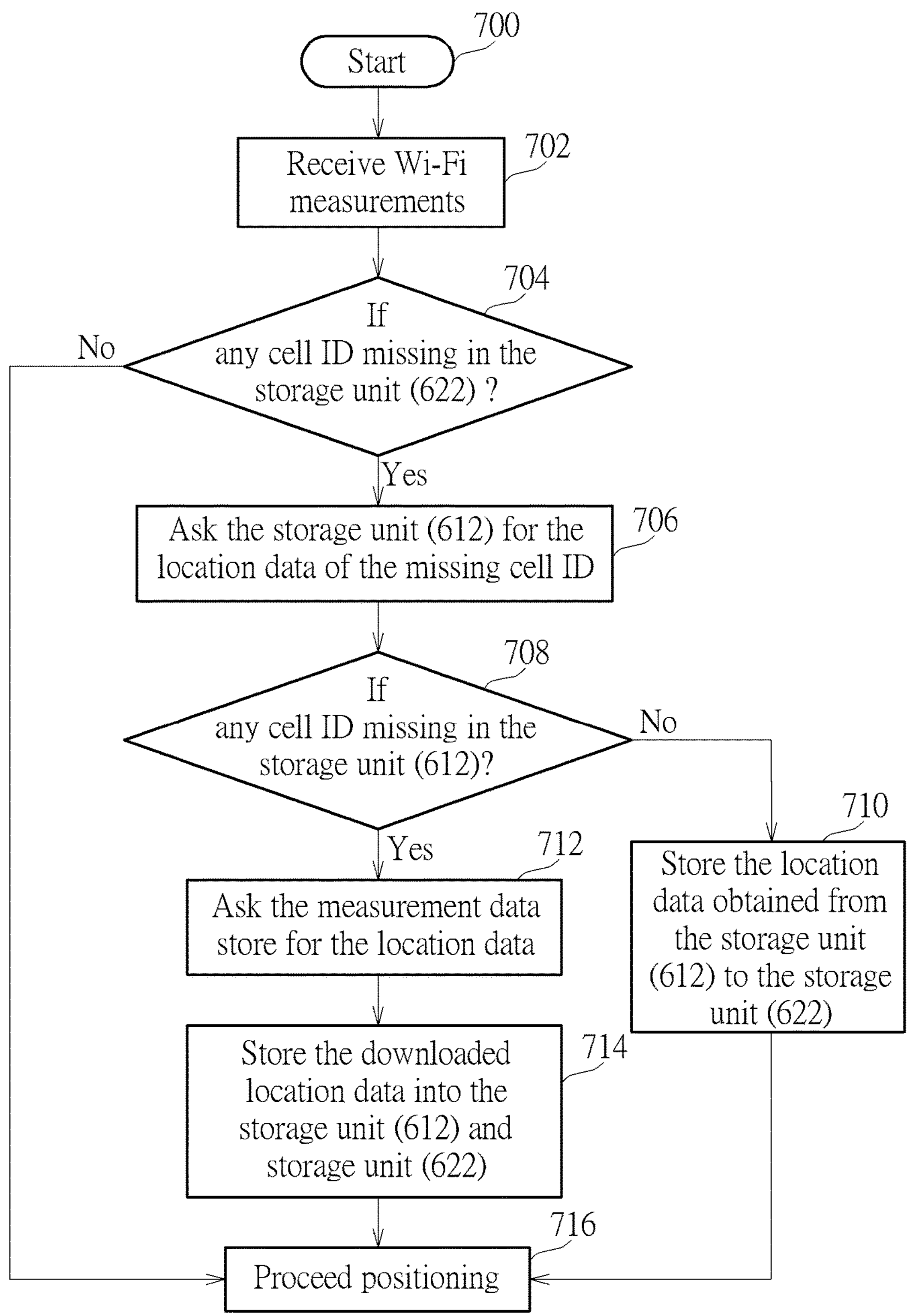
FIG. 7 is a flowchart of a method for performing the Wi-Fi positioning operations according to the third embodiment of the present invention.

Please refer to FIG. 6 and FIG. 7 together, where FIG. 6 is a block diagram illustrating the Wi-Fi positioning operations according to a third embodiment of the present invention, and FIG. 7 is a flowchart of a method for performing the Wi-Fi positioning operations according to the third embodiment of the present invention. In this embodiment, the electronic device 100 further comprises two storage units 612 and 622, where the storage unit 612 can be directly accessed by the application processor 110 and the hub sensor 120, and the storage unit 612 can be implemented by SRAM, DRAM or any other suitable memory device, and the storage unit 612 may be positioned within the application processor 110 or outside the application processor 110; and the storage unit 622 is directly accessed by the sensor hub 120, and the storage unit 622 can be implemented by SRAM, DRAM or any other suitable memory device, and the storage unit 622 may be positioned within the sensor hub 120 or outside the sensor hub 120. In this embodiment, a memory size of the storage unit 612 is much larger than a memory size of the storage unit 622, for example, the storage unit 612 may be 1-100 mega-bytes while the storage unit 622 may be 1-100 kilo-bytes. Referring to FIG. 7, in Step 700, the flow starts and user starts the positioning functions of the electronic device 100. In Step 702, the sensor hub 120 directly receives the Wi-Fi measurements from a Wi-Fi detecting circuit, wherein the Wi-Fi measurements may comprise Wi-Fi cell IDs capable of being detected by the electronic device 100 (i.e. the access points corresponding to these Wi-Fi cell IDs are close to the electronic device 100). In this embodiment, the Wi-Fi measurements comprise three Wi-Fi cell IDs as shown in FIG. 6. In Step 704, the sensor hub 120 directly asks the storage unit 622 for the location data of the three Wi-Fi cell IDs, and the storage unit 622 sends the location data of the Wi-Fi cell IDs, if any, to the sensor hub 120. In this embodiment, if the sensor hub 120 can get all of the location data of the Wi-Fi cell IDs (that is no Wi-Fi cell ID is missed), the flow enters Step 716 to proceed the Wi-Fi positioning operation; and if the sensor hub 120 cannot get all of the location data of the Wi-Fi cell IDs (that is one or more Wi-Fi cell IDs is/are missed), the flow enters Step 706. In Step 706, the sensor hub 120 directly asks the storage unit 612 for the location data that is not obtained from the storage unit 622 (e.g. the location data of the Wi-Fi cell ID "001a1eb59964 shown in FIG. 6), and the storage unit 612 sends the location data of the Wi-Fi cell IDs, if any, to the sensor hub 120. In this embodiment, if the sensor hub 120 can get all of the required location data from the storage unit 612, the flow enters Step 710; and if the sensor hub 120 cannot get all of the required location data from the storage unit 612 (that is one or more Wi-Fi cell IDs is/are still missed), the flow enters Step 712. In Step 710, the sensor hub 120 stores the obtained location data (e.g. the location data of the Wi-Fi cell ID "001a1eb59964 shown in FIG. 6) into the storage unit 622. In Step 712, the application processor 110 asks the measurement data store 102 for the location data that is not obtained from the storage unit 612, and the application processor 110 downloads the location data from the measurement data store 102 via Internet. In Step 714, the application processor 110 stores the downloaded location data into the storage unit 612, and the sensor hub 120 receives the downloaded location data from the application processor 110 and stores the downloaded location data into the storage unit 622. In Step 716, the sensor hub 120 uses at least a portion of the location data of the three Wi-Fi cell IDs to calculate a location of the electronic device 110.

In the embodiments shown in FIG. 6 and FIG. 7, the storage unit 622 of the sensor hub 120 can be regarded as a level-1 cache, and the storage unit 612 can be regarded as a level-2 cache. Compared with the embodiment shown in FIG. 2 and FIG. 3, by further using the storage unit 612, a cache hit rate may increase to reduce the network activity, and a power consumption of the network module 130 can be improved more.

Figure 8:
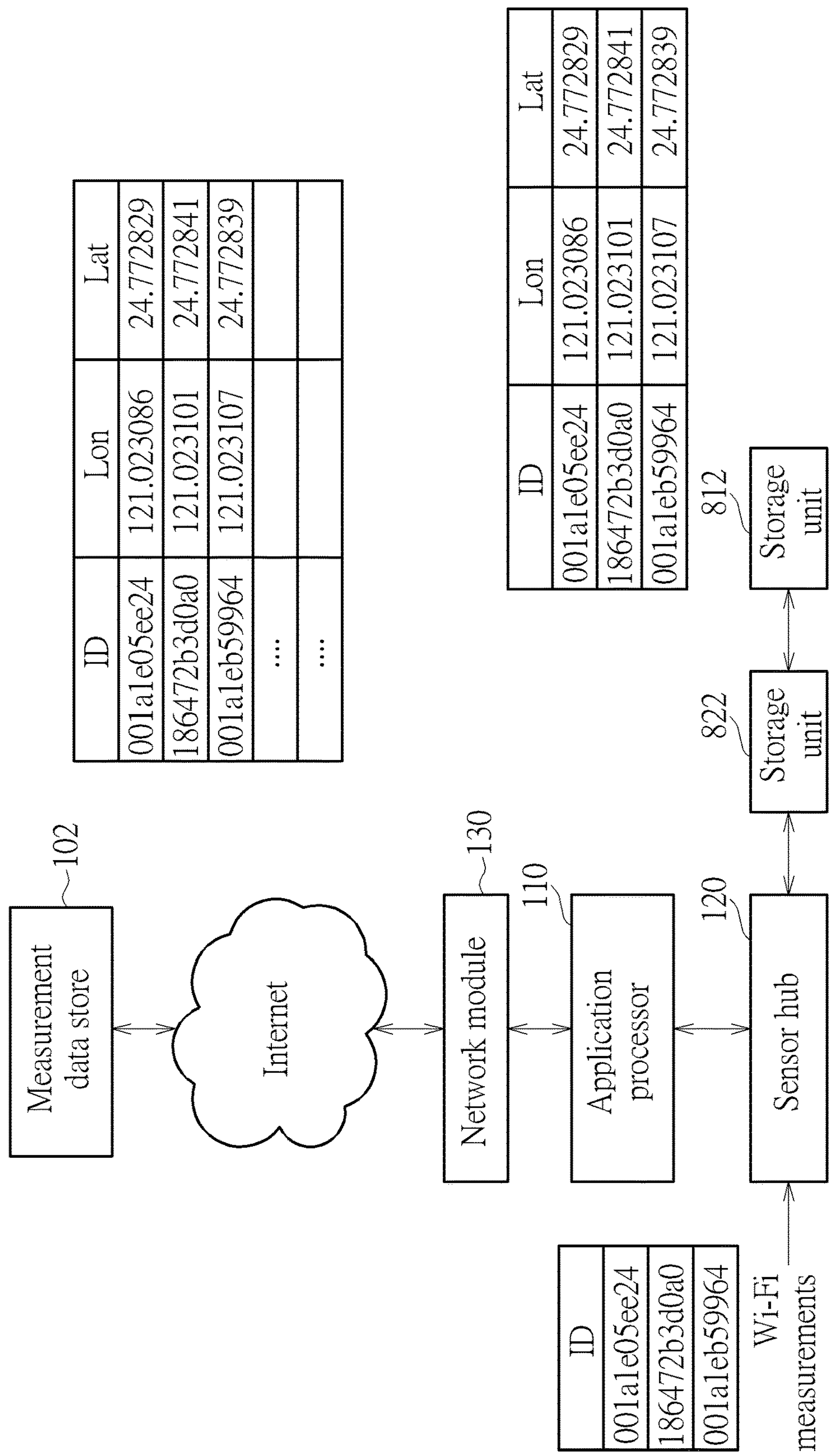
FIG. 8 is a block diagram illustrating the Wi-Fi positioning operations according to a fourth embodiment of the present invention.
Figure 9:
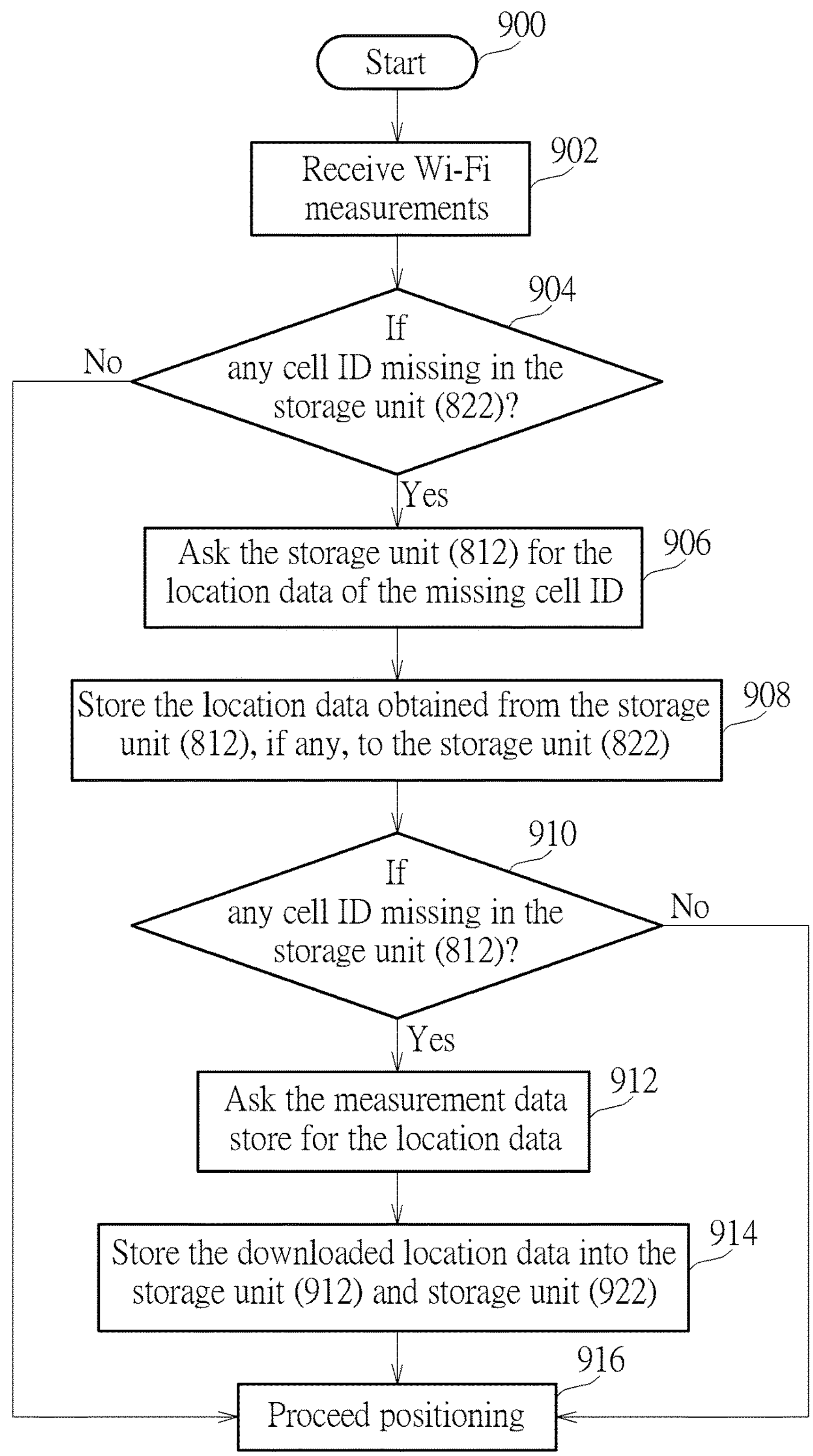
FIG. 9 is a flowchart of a method for performing the Wi-Fi positioning operations according to the fourth embodiment of the present invention.

Please refer to FIG. 8 and FIG. 9 together, where FIG. 8 is a block diagram illustrating the Wi-Fi positioning operations according to a fourth embodiment of the present invention, and FIG. 9 is a flowchart of a method for performing the Wi-Fi positioning operations according to the fourth embodiment of the present invention. In this embodiment, the electronic device 100 further comprises two storage units 812 and 822, where the storage unit 822 is directly accessed by the sensor hub 120, the storage unit 822 may be positioned within the sensor hub 120 or outside the sensor hub 120. In this embodiment, the storage unit 822 may be implemented by SRAM, the storage unit 812 may be implemented by DRAM, and a memory size of the storage unit 812 is much larger than a memory size of the storage unit 822. Referring to FIG. 9, in Step 900, the flow starts and user starts the positioning functions of the electronic device 100. In Step 902, the sensor hub 120 directly receives the Wi-Fi measurements from the network device 130, wherein the Wi-Fi measurements may comprise Wi-Fi cell IDs capable of being detected by the electronic device 100 (i.e. the access points corresponding to these Wi-Fi cell IDs are close to the electronic device 100). In this embodiment, the Wi-Fi measurements comprise three Wi-Fi cell IDs as shown in FIG. 8. In Step 904, the sensor hub 120 directly asks the storage unit 922 for the location data of the three Wi-Fi cell IDs, and the storage unit 922 sends the location data of the Wi-Fi cell IDs, if any, to the sensor hub 120. In this embodiment, if the sensor hub 120 can get all of the location data of the Wi-Fi cell IDs (that is no Wi-Fi cell ID is missed), the flow enters Step 916 to proceed the Wi-Fi positioning operation; and if the sensor hub 120 cannot get all of the location data of the Wi-Fi cell IDs (that is one or more Wi-Fi cell IDs is/are missed), the flow enters Step 906. In Step 906, the storage unit 822 directly asks the storage unit 812 for the location data that is not obtained from the storage unit 822, and the storage unit 812 sends the location data of the Wi-Fi cell IDs, if any, to the storage unit 822. In Step 908, if the storage unit 822 receives any location data from the storage unit 812, the storage unit 822 stores this location data for further use, and the storage unit 822 further sends the location data to the sensor hub 120. In Step 910, if the sensor hub 120 can get all of the required location data from the storage units 812 and 822, the flow enters Step 916 to proceed the Wi-Fi positioning operation; and if the sensor hub 120 cannot get all of the required location data from the storage units 812 and 822 (that is one or more Wi-Fi cell IDs is/are still missed), the flow enters Step 912. In Step 912, the application processor 110 asks the measurement data store 102 for the location data that is not obtained from the storage units 812 and 822, and the application processor 110 downloads the location data from the measurement data store 102 via Internet. In Step 914, the sensor hub 120 receives the downloaded location data from the application processor 110 and stores the downloaded location data into each of the storage units 822 and 812. In Step 916, the sensor hub 120 uses at least a portion of the location data of the three Wi-Fi cell IDs to calculate a location of the electronic device 110.

In the embodiments shown in FIG. 8 and FIG. 9, the storage unit 822 of the sensor hub 120 can be regarded as a level-1 cache, and the storage unit 812 can be regarded as a level-2 cache. Compared with the embodiment shown in FIG. 2 and FIG. 3, by further using the storage unit 812, a cache hit rate may increase to reduce the network activity, and a power consumption of the network module 130 can be improved more.

It is noted that a quantity of the Wi-Fi cell IDs and their location data is for illustrative purposes only, and the downloaded location data may be just stored to the storage unit without being used for calculating the location of the electronic device 110 immediately.

Figure 10:
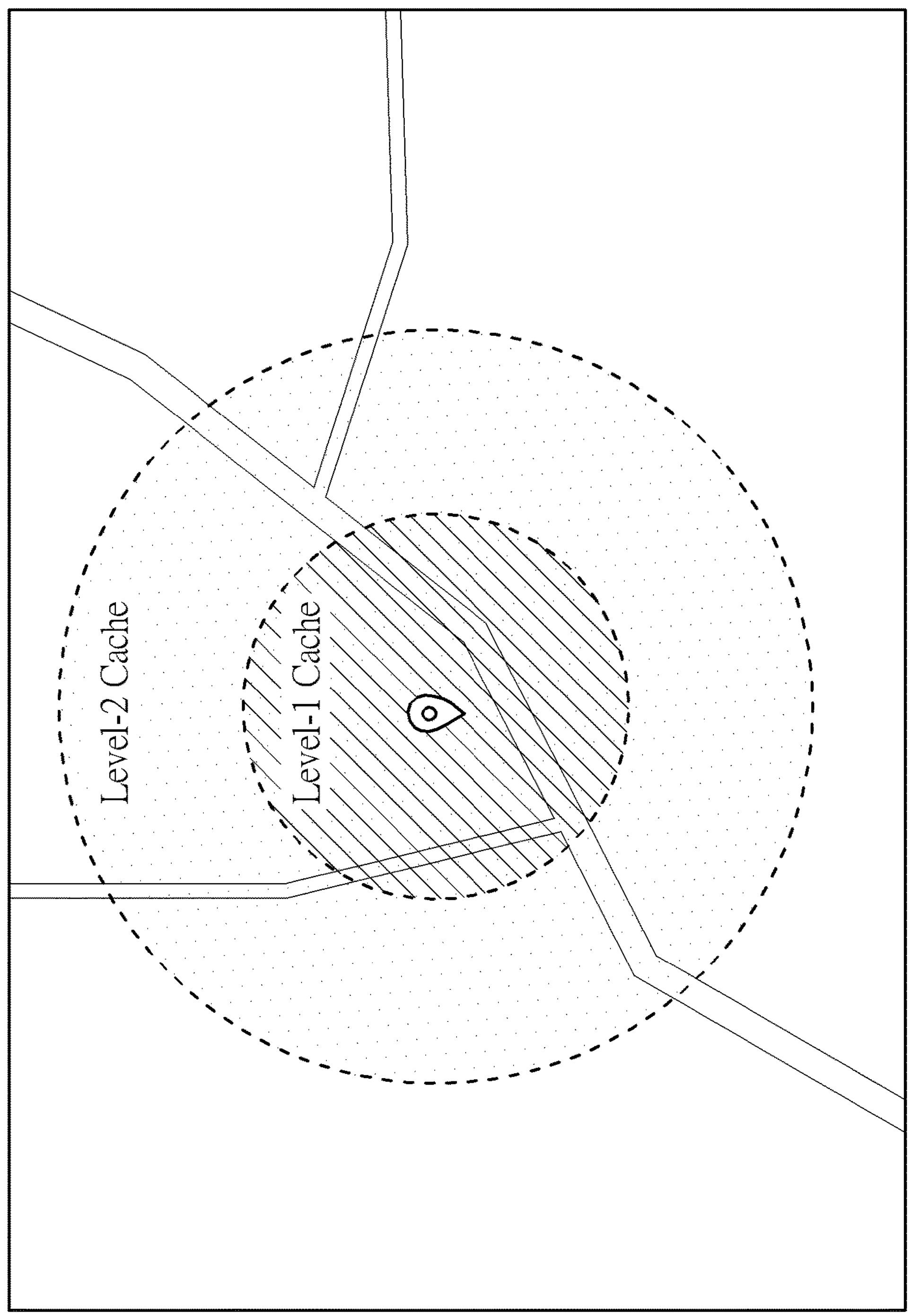
FIG. 10 shows the location data corresponding to the level-1 cache and the level-2 cache according to one embodiment of the present invention.

In the embodiments shown in FIGS. 4-9 having the level-1 cache (i.e. the storage unit 422/622/822) and the level-2 cache (i.e. the storage unit 412/612/812), the location data stored in the level-1 cache is closer to the electronic device 100 than the location data stored in the level-2 cache. Refer to FIG. 10, for example, location data corresponding to a region within an inner circle may be stored in the level-1 cache (i.e. the storage unit 422/622/822), and location data corresponding to a region within an outer circle may be stored in the level-2 cache (i.e. the storage unit 412/612/812). By using this cache arrangement, the location data stored in the level-1 cache should be used in the nearer further than the location data stored in the level-2 cache, and the access efficiency of the location data will be enhanced.

Figure 11:
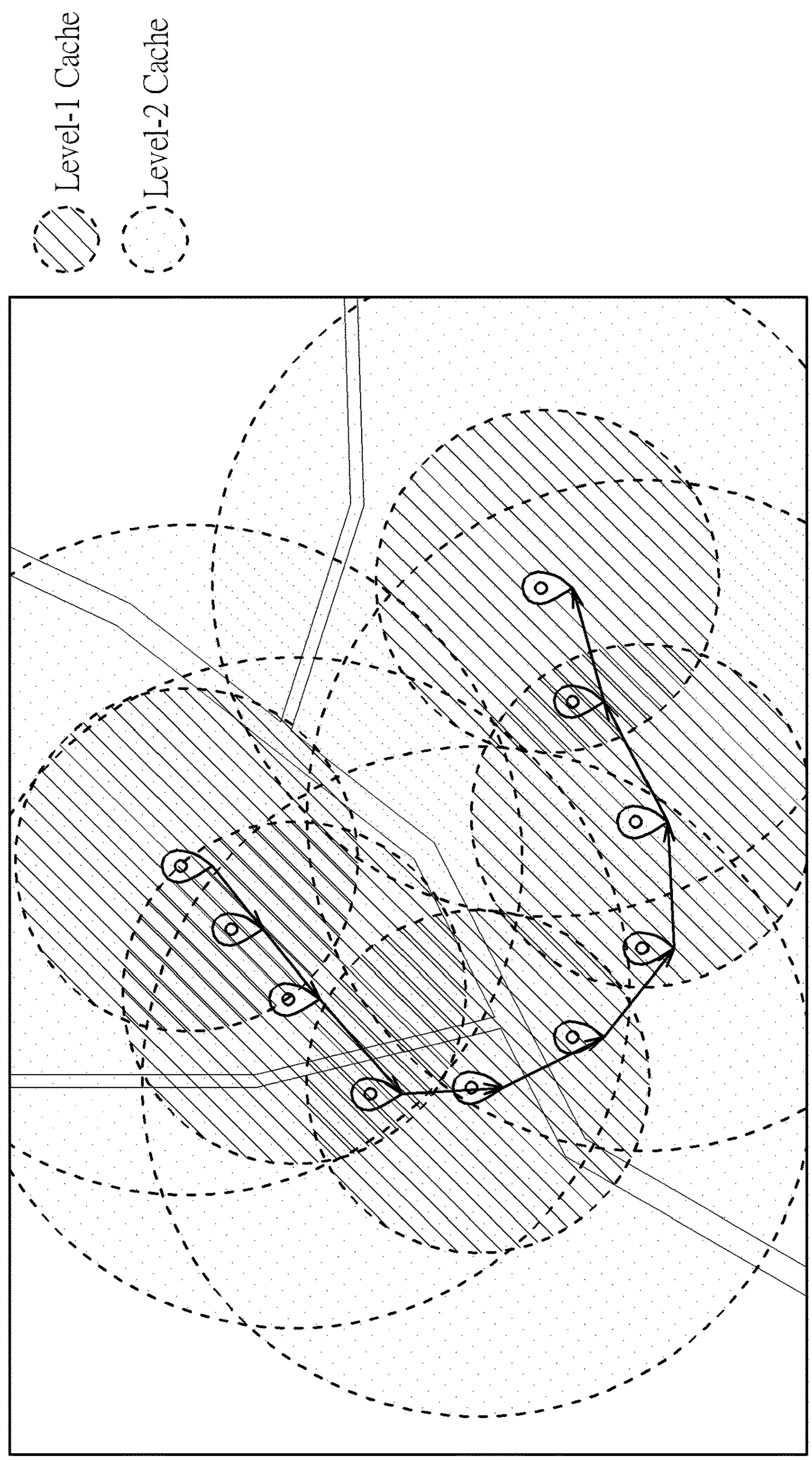
FIG. 11 shows that the location data stored in the level-1 cache and the level-2 cache is updated according to the user's position according to one embodiment of the present invention.

When the user moves with the electronic device 100, the location data stored in the level-1 cache and the level-2 cache is updated according to the user's position as shown in FIG. 11.

In the four embodiments shown in FIGS. 2-9, when the location data is missed in the storage units of the sensor hub 120 or the application processor 110, the application processor 110 can send the information about the missed Wi-Fi cell ID to the measurement data store 102 to ask for the location data, and the measurement data store 102 only sends the location data of the missed Wi-Fi cell ID to the electronic device 100. In other embodiments of the present invention, the electronic device 100 can pre-fetch the location data of other Wi-Fi cell IDs from the measurement data store 102, where the pre-fetched location data may correspond to the Wi-Fi cell IDs that is not detected by the electronic device 100 now, but it's possible to be used in the future.

The pre-fetching operation may correspond to a spatial locality method, a temporal locality method or a spatial locality in signal space method. In detail, regarding the spatial locality method, the spatial locality method may adopt a distance-based manner, a tile-based manner or a geocode-based manner, and when the application processor 110 asks the measurement data store 102 for the location data of a specific Wi-Fi cell ID, the application processor 110 may further send one or more conditions of the electronic device 100, such as an activity, location, moving speed and/or moving direction, to the measurement data store 102. Then, besides transmitting the location data of the specific Wi-Fi cell ID to the electronic device 100, the measurement data store 102 may further analyze the conditions of the electronic device 100 to determine a plurality of location data of the other Wi-Fi cell IDs that is close to the electronic device 100, and transmits the location data of the other Wi-Fi cell IDs to the electronic device 100, where the location data of the other Wi-Fi cell IDs can be regarded as the pre-fetching location data whose Wi-Fi cell IDs may not be detected by the electronic device 100 now. After receiving the pre-fetching location data from the measurement data store 102, the application processor 110 may store the pre-fetching location data to the level-2 cache such as the storage unit 412/612/812.

Regarding the temporal locality method, when the application processor 110 asks the measurement data store 102 for the location data of a specific Wi-Fi cell ID, besides transmitting the location data of the specific Wi-Fi cell ID to the electronic device 100, the measurement data store 102 may further analyze if any other Wi-Fi cell ID is often asked with the specific Wi-Fi cell ID (or the querying times are often close within a small period). If the other Wi-Fi cell ID having temporal locality exists, the measurement data store 102 transmits the location data of the other Wi-Fi cell ID(s) to the electronic device 100, where the location data of the other Wi-Fi cell IDs can be regarded as the pre-fetching location data whose Wi-Fi cell IDs may not be detected by the electronic device 100 now. After receiving the pre-fetching location data from the measurement data store 102, the application processor 110 may store the pre-fetching location data to the level-2 cache such as the storage unit 412/612/812.

Regarding the spatial locality in signal space method, when the application processor 110 asks the measurement data store 102 for the location data of a specific Wi-Fi cell ID, besides transmitting the location data of the specific Wi-Fi cell ID to the electronic device 100, the measurement data store 102 may further analyze if any other Wi-Fi cell ID belongs to the same Wi-Fi measurement with the specific Wi-Fi cell ID but to the different Wi-Fi measurement with the electronic device 100. If the other Wi-Fi cell ID having spatial locality in signal space exists, the measurement data store 102 transmits the location data of the other Wi-Fi cell ID(s) to the electronic device 100, where the location data of the other Wi-Fi cell IDs can be regarded as the pre-fetching location data whose Wi-Fi cell IDs may not be detected by the electronic device 100 now. After receiving the pre-fetching location data from the measurement data store 102, the application processor 110 may store the pre-fetching location data to the level-2 cache such as the storage unit 412/612/812.

In addition, regarding the update or replacement of the storage units shown in FIGS. 2-9, the application processor 110 or the sensor hub 120 may identify the most unlikely to-be-used location data, and discard these identified location data in the storage units. For example, the application processor 110 or the sensor hub 120 may discard the location data with the weakest degree of spatial locality, such as farthest geographical distance, farthest tile, or shortest geocode prefix first with the electronic device 100 or the cell IDs detected by the electronic device 100; or the application processor 110 or the sensor hub 120 may discard the location data with the weakest degree of temporal locality, that is the querying time of the cell ID corresponding to the discarded location data and the querying time of the cell IDs detected by the electronic device 100 have a largest period; or the application processor 110 or the sensor hub 120 may discard the location data with the lowest degree of the spatial locality in signal space with the electronic device 100 or the cell IDs detected by the electronic device 100, for example the largest hop counts in the signal space; or the application processor 110 or the sensor hub 120 may discard the earliest fetched location data, least recently used (LRU) location data, or the least frequently used (LFU) location data.

Briefly summarized, in the positioning method and associated electronic device of the present invention, the location data of the Wi-Fi cell IDs is stored in a storage unit of a sensor hub, and the stored location data can be reused in the next positioning operation. Therefore, the network activity and the usage of the application processor can be reduced to improve the power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:

an application processor, for executing applications running on a system of the electronic device; and a sensor hub, coupled to the application processor, for obtaining and processing sensed data from a plurality of sensors within the electronic device;

wherein the application processor further downloads location data from a remote device via a network module, and at least a portion of the downloaded location data is further stored in a storage unit of the sensor hub to be reused for positioning;

wherein the location data corresponds to a plurality of cell identities; and when a positioning operation is performed, the sensor hub receives surrounding cell IDs and asks the storage unit of the sensor hub for their location data directly; and the sensor hub calculates a location of the electronic device according to at least a portion of the location data obtained from the storage unit of the sensor hub;

wherein a portion of the downloaded location data is stored in the storage unit of the sensor hub, and another portion of the downloaded location data is stored in a storage unit of the application processor; and when a positioning operation is performed, the sensor hub receives surrounding cell IDs and asks the storage unit of the sensor hub for their location data directly; and the application processor asks the storage unit of the application processor for part or all of the location data only when the part or all of the location data cannot be found in the storage unit of the sensor hub; and the sensor hub calculates a location of the electronic device according to at least a portion of the location data obtained from the storage unit of the sensor hub and the location data obtained from the application processor.

2. The electronic device of claim 1, wherein the plurality of cell IDs comprises Wi-Fi access point IDs and/or cellular base station IDs and/or BLUEBOOTH device ID, and the location data comprises latitude and longitude corresponding to each cell ID.

3. The electronic device of claim 1, wherein when the sensor hub cannot obtain the location data of one or more surrounding cell IDs from the storage unit of the sensor hub and the storage unit of the application processor, the application processor further downloads the location data, which is not obtained from the storage units of the sensor hub and the application processor, from the remote device via the network module, and the sensor hub calculates the location of the electronic device according to at least a portion of the location data obtained from the storage unit of the sensor hub, the location data obtained from the storage unit of the application processor, and the newly downloaded location data; wherein the newly downloaded location data is stored in each of the storage unit of the sensor hub and the storage unit of the application processor.

4. An electronic device, comprising:

an application processor, for executing applications running on a system of the electronic device; and a sensor hub, coupled to the application processor, for obtaining and processing sensed data from a plurality of sensors within the electronic device;

wherein the application processor further downloads location data from a remote device via a network module, and at least a portion of the downloaded location data is further stored in a storage unit of the sensor hub to be reused for positioning;

wherein the location data corresponds to a plurality of cell identities; and when a positioning operation is performed, the sensor hub receives surrounding cell IDs and asks the storage unit of the sensor hub for their location data directly; and the sensor hub calculates a location of the electronic device according to at least a portion of the location data obtained from the storage unit of the sensor hub;

wherein a portion of the downloaded location data is stored in the storage unit of the sensor hub, and another portion of the downloaded location data is stored in a storage unit of the application processor; and when a positioning operation is performed, the sensor hub receives surrounding cell IDs and asks the storage unit of the sensor hub for their location data directly; and the sensor hub asks the storage unit of the application processor for part or all of the location data only when the part or all of the location data cannot be found in the storage unit of the sensor hub; and the sensor hub calculates a location of the electronic device according to at least a portion of the location data obtained from the storage unit of the sensor hub and the location data obtained from the application processor.

5. The electronic device of claim 4, wherein when the sensor hub cannot obtain the location data of one or more surrounding cell IDs from the storage unit of the sensor hub and the storage unit of the application processor, the application processor further downloads the location data, which is not obtained from the storage units of the sensor hub and the application processor, from the remote device via the network module, and the sensor hub calculates the location of the electronic device according to at least a portion of the location data obtained from the storage unit of the sensor hub, the location of obtained from the storage unit of the application processor, and the newly downloaded location data; wherein the newly downloaded location data is stored in each of the storage unit of the sensor hub and the storage unit of the application processor.

6. The electronic device of claim 4, wherein the plurality of cell IDs comprises Wi-Fi access point IDs and/or cellular base station IDs and/or BLUEBOOTH device ID, and the location data comprises latitude and longitude corresponding to each cell ID.

7. An electronic device, comprising:

an application processor, for executing applications running on a system of the electronic device; and a sensor hub, coupled to the application processor, for obtaining and processing sensed data from a plurality of sensors within the electronic device;

wherein the application processor further downloads location data from a remote device via a network module, and at least a portion of the downloaded location data is further stored in a storage unit of the sensor hub to be reused for positioning;

wherein the location data corresponds to a plurality of cell identities; and when a positioning operation is performed, the sensor hub receives surrounding cell IDs and asks the storage unit of the sensor hub for their location data directly; and the sensor hub calculates a location of the electronic device according to at least a portion of the location data obtained from the storage unit of the sensor hub;

wherein a portion of the downloaded location data is stored in the storage unit of the sensor hub, and another portion of the downloaded location data is stored in another storage unit of the sensor hub; and when a positioning operation is performed, the sensor hub receives surrounding cell IDs and asks the storage unit of the sensor hub for their location data directly; and the storage unit asks the other storage unit of the sensor hub for part or all of the location data only when the part or all of the location data cannot be found in the storage unit of the sensor hub; and the sensor hub calculates a location of the electronic device according to at least a portion of the location data obtained from the storage unit and the other storage unit of the sensor hub.

8. The electronic device of claim 7, wherein when the sensor hub cannot obtain the location data of one or more surrounding cell IDs from the storage unit and the other storage unit of the sensor hub, the application processor further downloads the location data, which is not obtained from the storage unit and the other storage unit of the sensor hub, from the remote device via the network module, and the sensor hub calculates the location of the electronic device according to at least a portion of the location data obtained from the storage unit and the other storage unit of the sensor hub and the newly downloaded location data; wherein the newly downloaded location data is stored in each of the storage unit of the sensor hub and the other storage unit of the sensor hub and the storage unit of the application processor.

9. The electronic device of claim 7, wherein the plurality of cell IDs comprises Wi-Fi access point IDs and/or cellular base station IDs and/or BLUEBOOTH device ID, and the location data comprises latitude and longitude corresponding to each cell ID.

* * * * *